June 9, 1964 P. R. GRAMO 3,136,295
LIQUID LEVEL SIGNAL DEVICE FOR TANKS
Filed May 21, 1962

INVENTOR.
PHILIP R. GRAMO
BY
Towson Price
ATTORNEY

United States Patent Office 3,136,295
Patented June 9, 1964

3,136,295
LIQUID LEVEL SIGNAL DEVICE FOR TANKS
Philip R. Gramo, 94 Thomas St., Bloomfield, N.J.
Filed May 21, 1962, Ser. No. 196,175
13 Claims. (Cl. 116—118)

This invention relates to signal devices for use in filling tanks and, more particularly, such used with fill pipes adapted to have liquid passed therethrough when such tanks are filled and which includes whistle means indicating the rise of liquid level to a certain height in the tank.

The signaling device of my invention includes a feed passage or pipe for the delivery of liquid into a tank through a filler duct and an air whistle with a supporting pipe which may when in use lie either below the top of the filler duct or extend to a position thereabove and be removable when not in use, thereby enabling the operator to insure that the whistle is clean and not stopped up. During the filling of a tank, as the liquid level rises, air is forced from the tank through the whistle which then emits a sound. The sound continues until the inlet end of the passage connected to the whistle is covered by liquid and the flow of air therethrough stopped.

With such a device it is important that the inlet end of the whistle passage be positioned in a tank at a predetermined distance below the bottom of the filling duct and that the filling pipe, which parallels said passage, extend below the bottom thereof. Under these conditions a sufficient time delay is afforded after the whistle sound ceases to shut off the delivery of liquid to the tank.

An object of my invention is to provide a simple, inexpensive and efficient signal device which may be used with domestic fuel tanks for residences, which tanks are submerged or buried under a lawn or other part of a yard, and which shows when the tank is approaching the full condition, in order to avoid overflow and consequent damage to the lawn or portion of the yard surrounding the fill pipe, as well as wastage of oil or other liquid.

Another object of my invention is to provide an improved device which may be readily and accurately positioned in a tank filling duct to indicate a near-filled liquid level in the tank.

A further object of my invention is to provide a liquid level signal device which may be conveniently attached to the conventional filler duct of a tank which is submerged in the ground, which will emit a sound during filling until the liquid level approaches the near filled condition, and which may be used with or without a rod carried by a float and which rises as the level of liquid in the tank approaches the top to show when to stop filling to avoid overflow.

A still further object of my invention is to provide a liquid level signal device which not only shows when the liquid level in a submerged tank is near the top of the tank, but also allows for venting the air from the tank during a filling operation.

These and other objects and advantages will become apparent from the following detailed description when taken with the accompanying drawings. It will be understood that the drawings are for the purposes of illustration and do not define the scope or limits of the invention, reference being had for the latter purpose to the appended claims.

In the drawings, wherein like reference characters denote like parts in the several views.

The present invention is a continuation-in-part of, or an improvement over that described and claimed in, my copending application, Serial No. 143,689, filed October 9, 1961, and titled Liquid Level Indicator and Method. In accordance with the present invention, I propose to either add to the liquid level indicator device of said application a signal device or use such a signal device instead of the indicator device of said application.

Figure 2:
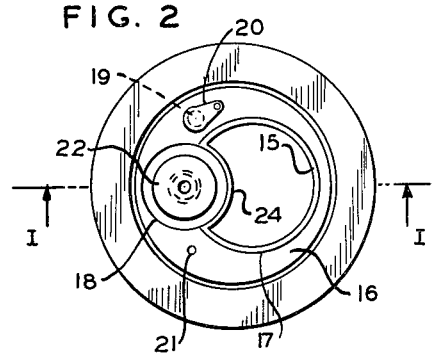
FIGURE 2 is a plan of the filler duct top fitting and associated parts, embodying my signal device as shown in FIGURE 1.
Figure 5:
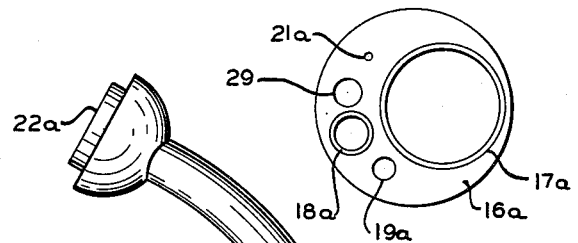
FIGURE 5 is a plan of the filler pipe and the associated top flange thereof shown in FIGURE 4.
Figure 1:
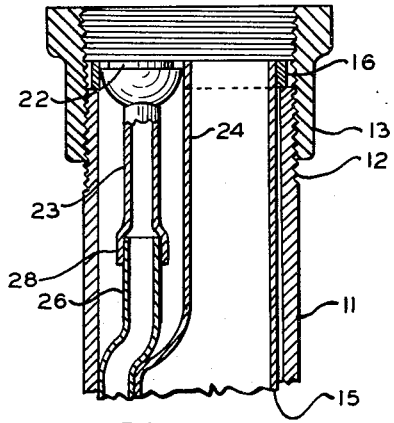
FIGURE 1 is a vertical sectional view of the top portion of a filler duct and top fitting thereof, on the line I—I of FIGURE 2 in the direction of the arrows.
Figure 3:
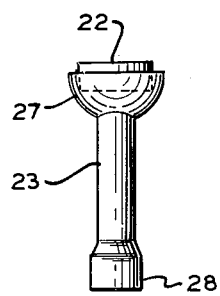
FIGURE 3 is an elevational view of the separated whistle tube and whistle such as used in the embodiment of FIGURES 1 and 2.

Referring to the drawings in detail and first considering the embodiment of my invention illustrated in FIGURES 1, 2 and 3, there is shown a filler duct 11 which is externally threaded as indicated at 12. It has a top fitting 13 with cooperating internal threads so that it may be screw-threaded thereto or removed therefrom. The fitting 13 is normally closed by an externally threaded cap or plug, not shown, whereby when not used for a filling operation, the duct 11 may be closed and dirt or other foreign material prevented from entering.

Figure 4:
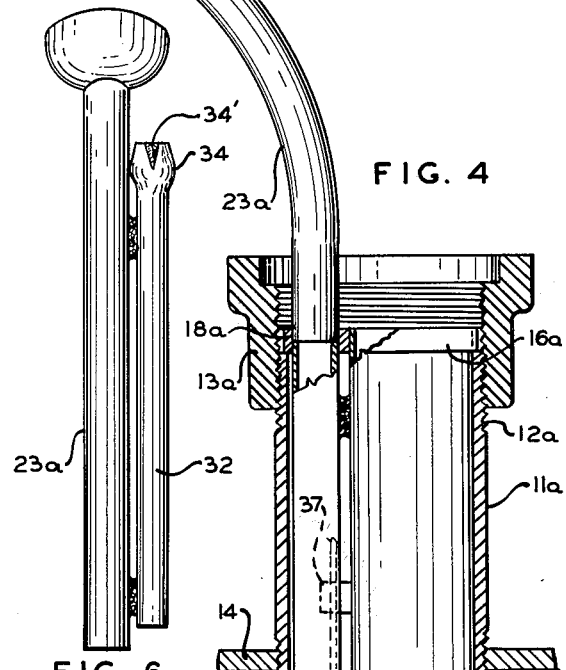
FIGURE 4 is a vertical sectional view, corresponding to FIGURE 1 but showing another embodiment of my invention.
Figures 6, 7:
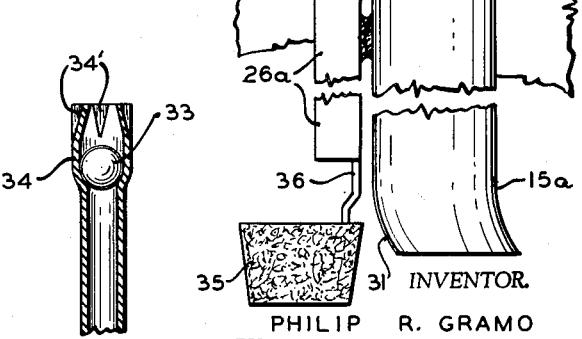
FIGURE 6 is an elevational view of the whistle tube, whistle and associated ball valve tube when separated from the associated parts of FIGURE 4 and viewed from the right as shown in said figure.
FIGURE 7 is an axial sectional view of the top portion of the ball valve illustrated in FIGURE 6 and its associated ball.

In the present embodiment, the tank 14, not shown in FIGURE 1 but shown in FIGURE 4, may also be provided with a conventional vent pipe, such as that designated 90 in FIGURE 6 of the Gardner Patent No. 2,972,362, dated February 21, 1961, which extends from the top wall of the tank to a position above the ground where it is protected by a suitable cover.

The signal device illustrated as embodying my invention here is associated with a filler pipe 15, which may be of copper and have brazed or otherwise connected to its top, or upper end portion, an outstanding eccentric collar 16. The collar for that purpose is formed initially as a generally circular disc with an eccentric hole 17 in which the top end portion of the pipe 15 fits and is secured, thereby making such disc a flange 16 at the top end of the pipe. In the wider portion of the flange 16, I provide a series of apertures 18, 19 and 21. The aperture 18 is relatively large to receive a whistle 22 and its carrying tube 23, the filler pipe 15 being, for that purpose, correspondingly formed, as indicated at 24, to provide room for the reception of said whistle, as shown most clearly in FIGURES 1 and 2.

The aperture 19 is a mere venting aperture which normally may be closed by a wobble cover 20, that is, one that is sufficiently loose so that it will vent air when the air pressure reaches a predetermined point. The other aperture 21 is relatively small and may serve to receive an indicator rod, such as that designated 36 and carried by a float such as that designated 35 in FIG. 4. If such an indicator rod and float are not to be used, then the aperture 21 may be plugged, if it is found that too much air leaks therefrom during filling so as to interfere with operation of the whistle 22.

In the present embodiment there is an intrusion tube 26 disposed between the pipe 15 and the duct 11 and with its upper end portion bent into the hollowed portion 24 of the pipe 15. The tube 26 extends a desired distance below the top of the tank 14, corresponding with that which the intrusion tube 26a of the embodiment of FIGURES 4 to 7, inclusive, extends below the top of the tank 14. That is, it extends to such a distance below the top of the tank that when said tank is being filled, air passes therethrough until said tank is nearly full. Then the lower end of said tube 26 is submerged in the rising liquid and the sound emitted by the whistle stops, indicating that the tank is nearly full so that the operator can discontinue the filling operation.

As in the second embodiment referred to, the intrusion tube 26 stops short of the lower end of the filler pipe 15, as the intrusion tube 26a stops short of the lower end of the filler pipe 15a in FIGURE 4, so that turbulence of the liquid flowing into said tank does not interfere with air passing out of the intrusion tube 26 to the whistle tube 23. In the present embodiment, the lower end of the whistle tube 23 is formed so that it snugly fits or telescopes over the top portion of the intrusion tube 26. It is of such length that when in place the top of the whistle 22 is approximately flush with the top of the flange 16.

Although I do not wish to be limited to the form of the whistle 22, yet it is desirably of the button type having aligned upper and lower orifices through which air passes to make a whistling sound. It may fit in the top of a generally hemispherical shell 27 which is, in turn, secured to the top of the whistle tube 23 in any suitable manner, as by having a top portion of said whistle tube flanged over and brazed to the inner surface of the shell 27. In the present embodiment, the lower end of the whistle tube is expanded, as indicated at 28, so as to telescope with the top of the intrusion tube 26, although this arrangement may, if desired, be reversed, the intrusion tube being fixed to the pipe 15.

Referring now to the embodiment of my invention illustrated in FIGURES 4, 5, 6 and 7, there is shown a filler duct 11a which is externally threaded, as indicated at 12a. It has a top fitting 13a with cooperating internal threads so that it may be screw threaded thereto or removed therefrom. The fitting 13a is normally closed by an externally threaded cap or plug, not shown, whereby when not used for a filling operation the duct 11a may be closed to exclude dirt or other foreign material.

In the present embodiment, the tank 14 may also be provided with a vent pipe as in the first embodiment, which extends from the top wall of the tank 14 to a position above the ground where it is protected by a suitable cover.

The signal device illustrated as embodying my present invention is associated with a filler pipe 15a which may be of copper and have brazed or otherwise connected to its top or upper end portion an outstanding eccentric collar 16a. The collar for that purpose is formed initially as a generally circular disc with an eccentric hole 17a in which the top end portion of the filler pipe 15a fits and is secured, thereby making the disc a flange 16a at the top end of the tube. In the wider portion of the flange 16a is provided a series of apertures 18a, 19a, 21a and 29. The aperture 18a is relatively large to telescopingly receive the lower end portion of the whistle tube 23a, which carries on its upper or outer end a whistle 22a, which may correspond with the whistle 22 of the preceding embodiment.

The aperture 19a is a mere venting aperture which normally may be closed by a wobble cover, not shown, but corresponding with the wobble cover 20 of the preceding embodiment. The aperture 21a is relatively small and may serve to receive an indicator rod such as that designated 36 and carried by a float such as that designated 35. If such an indicator rod and float are not to be used, then the aperture 21a may be plugged if it is found that too much air leaks therefrom during filling so as to interfere with operation of the whistle 22a.

In the present embodiment, there is an intrusion tube 26a disposed between the pipe 15a and the duct 11a and extending a desired distance below the top of the tank 14, as illustrated. That is, it extends to such a distance below the top of the tank that when the latter is being filled, air passes therethrough until said tank is nearly full. Then the lower end of said tube 26a is submerged in the rising liquid and the sound emitted by the whistle stops, indicating that the tank is nearly full so that the filling operation may be discontinued. Tube 26a is connected to tube 15a.

This termination of the intrusion tube 26a short of the lower end of the filler pipe 15a is so that turbulence of the liquid flowing into said tank does not interfere with air passing out of the intrusion tube 26a to the whistle tube 23a. As a further means of preventing undesired interference with the passage of air to the intrusion tube 26a, the lower end of the filler pipe 15a may be bent away from the lower end of intrusion tube 26a as indicated at 31. This bending also guides the stream of liquid, such as oil, so that it does not directly impinge on the bottom wall of the tank and stir up foreign matter such as dirt which may have settled thereon. In the present embodiment, the lower end of the whistle tube is formed so that it snugly fits or telescopes in the aperture 18a in the flange 16a and is curved as illustrated in FIGURE 4 so that the whistle 22a thereof is out of the way of the filler spout used for introducing liquid into the pipe 15a.

Although I do not wish to be limited to the form of the whistle 22a, yet it is desirably of the button type, as in the preceding embodiment and connected to the tube 23a in the same way. In the present embodiment, however, the lower end of the whistle tube, which is relatively long and extends a substantial distance above the fitting 13a is not formed to telescope over the upper end of the intrusion tube 26a, but rather to abut thereagainst after telescoping in the aperture 18a in the flange 16a.

Desirably secured to the tube 23a and correspondingly curved is a ball valve tube 32 which stops slightly short of the lower end of the tube 23a so as not to telescope in the aperture 29, but rather register therewith when in place, and so conduct excess air therefrom when the pressure of the air in the tank 14 rises sufficiently to lift the ball 33 in an enlarged portion 34 at the upper end of said tube. This ball is prevented from being lost from the upper end portion 34 of the tube by having said tube crimped thereover, as indicated at 34'. This restricts the size of the end portion of the enlargement 34 sufficiently to prevent loss of the ball 33 after placing it in position.

In the present embodiment, there is shown a float 35, carrying an indicator rod 36. This rod performs the function to give a visual indication of the level of liquid in the tank, in addition to the audible indication, as an alternative to using only the audible indication. There is a guide 37 secured to the side of the pipe 15a and cooperating with the aperture 21a which receives the upper end of said rod 36. The float 35 in its operation supports the indicator rod 36 and normally lies above the lower end of the filler pipe 15a, as indicated by the breaking away of said pipe to show that it extends further down than is illustrated in the drawing.

From the foregoing disclosure, it will be seen that I have devised an audible indicator for tanks, which emits a whistling sound during the filling of such a tank until the level of liquid therein rises to near the top of the tank, when it stops and thus warns the operator to stop filling. In both forms the whistle and whistle tube are removable, but in the first form the whistle and tube may, after use, be entirely covered by the usual plug or filling cap, whereas in the second form, the whistle and its tube, together with the attached ball valve tube for venting excess air, may be removed after filling the tank and kept by the operator for use in connection with filling another tank.

It will be understood that the whistle does not need much air for its operation and so additional venting is provided for to avoid backing up of the liquid as it flows into the tank, due to increase in air pressure beyond the desired point.

Having now described my invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A liquid level signal device for attachment to the filler duct of a liquid storage tank comprising a generally cylindrical filler pipe, of substantially less diameter than said duct, which extends from the top of said duct through and to a substantial distance below the top wall of the tank with which it is associated, a generally circular disc with an eccentric hole in which the top end portion of said pipe fits and is secured to form a flange thereon, the outer edge portion of said flange being supported on the top of said duct, an intrusion tube between said filler duct and said pipe, said tube being so positioned that its lower end is disposed between the top wall of the tank and the lower end of said pipe at the elevation in said tank at which it is desired to obtain an indication of the rise of a liquid flowing into said tank, a removable whistle tube adapted to be fitted end to end with respect to said intrusion tube, and a whistle mounted on the outer end of said whistle tube.

2. A liquid level signal device as recited in claim 1, wherein there is a series of apertures in the wider portion of said flange, one of said apertures being formed to receive the lower end portion of said whistle tube, another of said apertures being formed to receive an indicator rod and still another to allow for venting excess air from the tank as the same is being filled.

3. A liquid level signal device as recited in claim 1, wherein there is a rod guide secured to the side of said pipe and with an aperture aligned with a flange aperture and through which an indicator rod may pass.

4. A liquid level signal device as recited in claim 1, wherein the lower end of the whistle tube may be telescoped with respect to the intrusion tube.

5. A liquid level signal device as recited in claim 1, wherein the lower end of the whistle tube telescopes with respect to the flange on the top of the pipe.

6. A liquid level signal device as recited in claim 1, wherein there is a top fitting threaded to the exterior of the duct and internally threaded to receive a closure plug, and the outer edge portion of said flange is such that it lies within the threaded interior of said fitting.

7. A liquid level signal device as recited in claim 6, wherein the whistle tube and its whistle are such that when in place said whistle lies below the top of said flange so as to be normally covered by said plug.

8. A liquid level signal device as recited in claim 1, wherein the whistle tube is elongated so that when in place the whistle is disposed above the top of the fitting.

9. A liquid level signal device as recited in claim 8, wherein the whistle tube is curved.

10. A liquid level signal device as recited in claim 9, wherein there is a vent tube secured to and running along a side of the whistle tube, and a ball valve in the outer end of said vent tube.

11. A liquid level signal device for attachment to the filler duct of a liquid storage tank comprising a generally cylindrical filler pipe, of substantially less diameter than said duct, which extends from the top of said duct through and to a substantial distance below the top wall of the tank with which it is associated, a generally circular disc with an eccentric hole in which the top end portion of said pipe fits and is secured to form a flange thereon, the outer edge portion of said flange being supported on the top of said duct, an intrusion tube between said filler duct and said pipe, said tube being so positioned that its lower end is disposed between the top wall of the tank and the lower end of said pipe at the elevation in said tank at which it is desired to obtain an indication of the rise of a liquid flowing into said tank, a removable whistle tube adapted to be fitted end to end with respect to said intrusion tube, a whistle mounted on the outer end of said whistle tube, a top fitting threaded to the exterior of said duct and internally threaded to receive a closure plug, the outer edge portion of said flange being such that it lies within the threaded interior of said fitting, said whistle tube and whistle being of such size that, when in place, the whistle lies below the top of said flange so as to be normally covered by said plug, a series of apertures in the wider portion of said flange, one of said apertures being formed to receive an indicator rod and another to allow for venting air from the tank when the same is being filled, a rod guide secured to the side of said pipe and with an aperture aligned with a flange aperture and through which an indicator rod may pass, and the lower end of said whistle tube, when in place, being telescoped with respect to said intrusion tube.

12. A liquid level signal device for attachment to the filler duct of a liquid storage tank comprising a generally cylindrical filler pipe, of substantially less diameter than said duct, which extends from the top of said duct through and to a substantial distance below the top wall of the tank with which it is associated, a generally circular disc with an eccentric hole in which the top end portion of said pipe fits and is secured to form a flange thereon, the outer edge portion of said flange being supported on the top of said duct, an intrusion tube between said filler duct and said pipe, said tube being so positioned that its lower end is disposed between the top wall of the tank and the lower end of said pipe at the elevation in said tank at which it is desired to obtain an indication of the rise of a liquid flowing into said tank, a removable whistle tube adapted to be fitted end to end with respect to said intrusion tube, a whistle mounted on the outer end of said whistle tube, a top fitting threaded to the exterior of said duct and internally threaded to receive a closure plug, the outer edge portion of said flange being such that it lies within the threaded interior of said fitting, a series of apertures in the wider portion of said flange, one of said apertures being formed to receive the lower end portion of said whistle tube, another being formed to receive an indicator rod and still another to allow for venting excess air from the tank when the same is being filled, a rod guide secured to the side of said pipe and with an aperture aligned with a flange aperture and through which an indicator rod may pass, said whistle tube being so elongated that, when in place, the whistle is disposed above the top of the fitting, a vent tube secured and running along a side of the whistle tube, a ball valve in the outer end of said vent tube, the lower end of said whistle tube telescoping with respect to the flange on the top of the pipe, and the whistle tube being, when in place, curved away from the axis of the filling tube.

13. A liquid level signal device as recited in claim 8, wherein there is a vent tube secured to and running along a side of the whistle tube, and a ball valve in the outer end of said vent tube.

References Cited in the file of this patent

UNITED STATES PATENTS

| | | |
|---|---|---|
| 1,243,587 | Burkett | Oct. 16, 1917 |
| 2,360,338 | Hammond | Oct. 17, 1944 |
| 2,493,699 | Scully | Jan. 3, 1950 |
| 2,746,415 | Campbell | May 22, 1956 |
| 2,811,179 | Greenwood | Oct. 29, 1957 |
| 2,897,853 | Anstine | Aug. 4, 1959 |
| 2,935,099 | Hayes | May 3, 1960 |
| 2,972,362 | Gardner | Feb. 21, 1961 |

FOREIGN PATENTS

| | | |
|---|---|---|
| 296,977 | Switzerland | May 17, 1954 |